Aug. 25, 1931.  G. A. NEWHOUSE  1,820,886
AUXILIARY GEARING
Filed Sept. 8, 1930   2 Sheets-Sheet 1

Inventor
George A. Newhouse
Attorney

Aug. 25, 1931. G. A. NEWHOUSE 1,820,886
AUXILIARY GEARING
Filed Sept. 8, 1930 2 Sheets-Sheet 2

Inventor
George A. Newhouse
By Thomas L. Aga
Attorney

Patented Aug. 25, 1931

1,820,886

UNITED STATES PATENT OFFICE

GEORGE A. NEWHOUSE, OF YORKTOWN, INDIANA, ASSIGNOR OF ONE-HALF TO CARL H. WRIGHT, OF YORKTOWN, INDIANA

AUXILIARY GEARING

Application filed September 8, 1930. Serial No. 480,361.

This invention relates to improvements in power transmitting mechanisms for motor driven vehicles, especially those vehicles of this class known as tractors. The work to be performed by a vehicle of this kind covers a wide range of requirements and at times the duty imposed upon same is abnormal and extremely severe. It being desirable in the construction of a machine of this type to keep the weight, and the manufacturing cost thereof at a minimum, there has long been the problem of providing a practicable gearing whereby power for actuating the tractor wheels, sufficient for all emergencies, may be had.

The general object of my invention herein, is to provide a gearing for a machine of the above description which is operable in connection with the power shaft of the usual change speed mechanism, whereby ample power may be had for actuating the tractor wheels without liability of overstraining or the impairment of any of the parts of the machine.

Other objects are to provide means whereby driving power for machinery which is separate and apart from that of the vehicle, may be had. Still further aims of the invention are to provide a gearing of the kind described which is economical of construction, and of relatively few parts, and which is close-built, strong and durable.

The aforesaid purposes, as well as more specific objects of my invention as same will appear in the following description, are accomplished by, and the invention is embodied in the new construction, combination and arrangement of parts described in the following specification and illustrated in the accompanying drawings.

Figure 1:
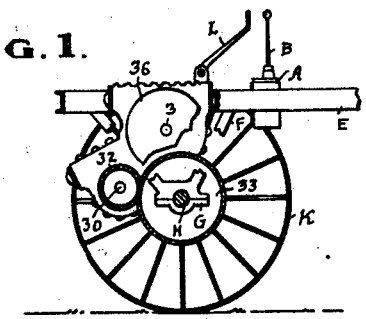

Figure 1 is a side view of my invention in operative position, there being shown the rear axle structure, and driving wheels, and a portion of the frame of the vehicle.

Figure 3:
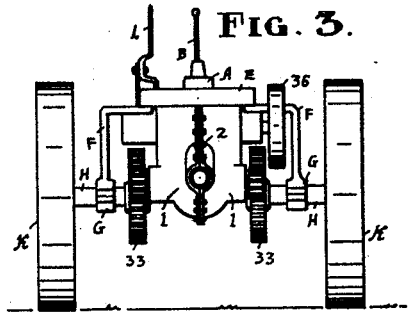
Figure 2:
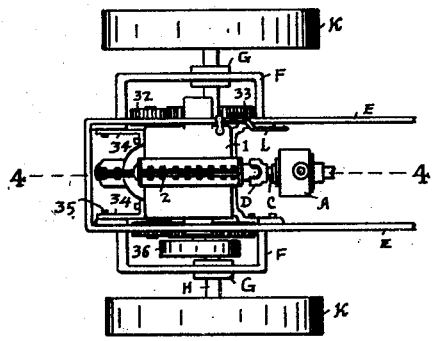
Figure 4:
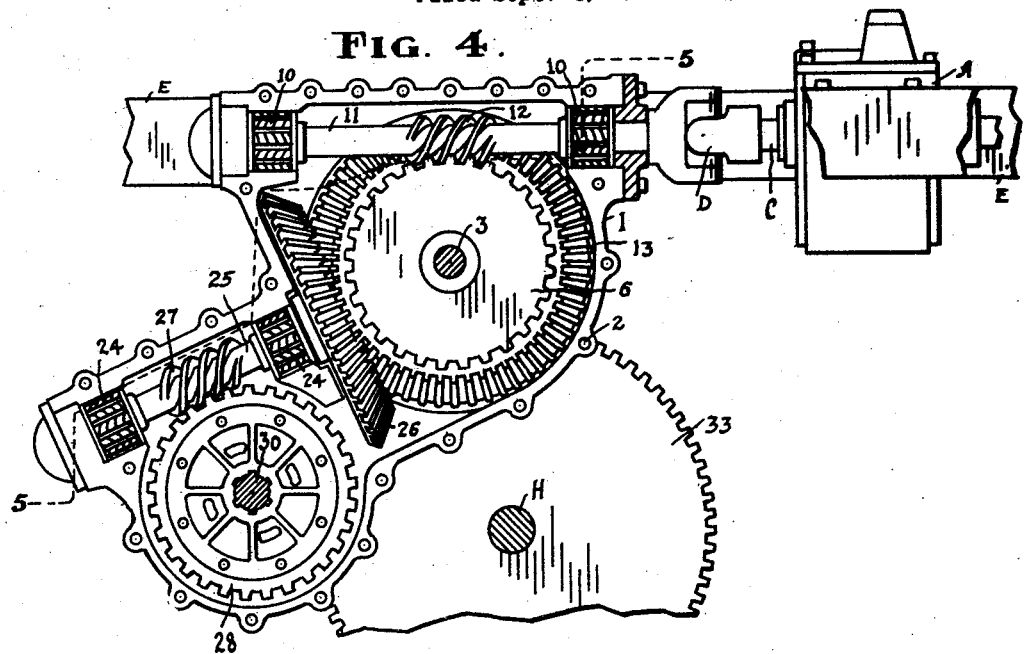

Figure 2 is a top plan view of Figure 1.
Figure 3 is an end view of Figure 1.
Figure 4 is an enlarged vertical central sectional view taken on the line 4—4 in Figure 2.

Figure 5:
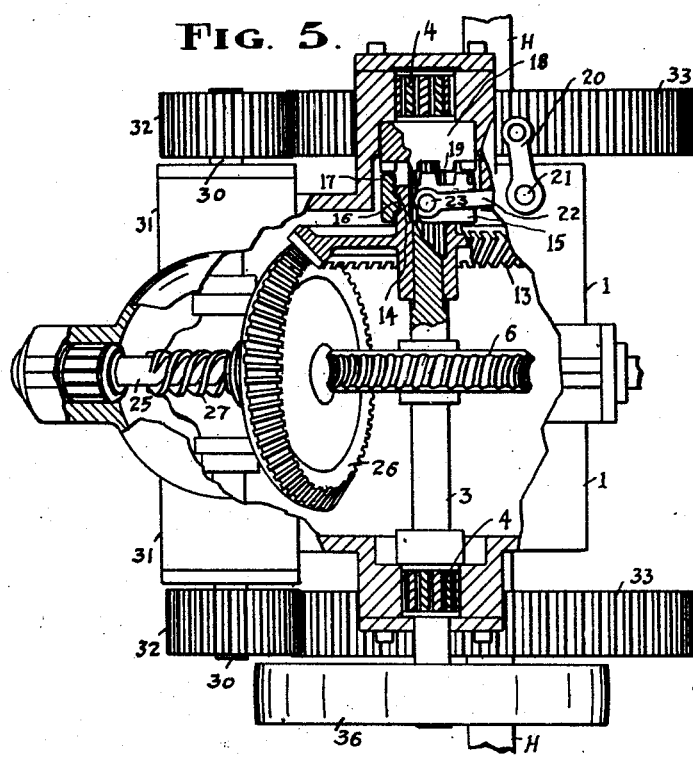

Figure 5 is a sectional top plan view taken on the line 5—5 in Figure 4.

In the general structure of a vehicle of the class referred to, there is the usual change speed mechanism A with its control lever B, and the transmission drive stub shaft C. A flexible coupling D is a connection of a desirable form, between the said shaft C and the driving shaft of my new and improved gearing. The frame E of the vehicle rests on suitable support members F and F that are carried by the rear axle housing structures G and G within which are retained the journaled rear axles H and H whose ends are secured to the tractor wheels K and K.

My invention contemplates the providing of a casing adapted to be supported by the vehicle, a driving shaft journaled in said casing and which is adapted to be actuated by the power from the vehicle motor, a differential gearing with worm wheel retained in the casing, a worm on the driving shaft, a second shaft journaled in said casing and which extends outside thereof, a worm wheel secured on said second shaft and which meshes with said worm carried by the drying shaft, a bevel gear wheel splined on said second shaft, a clutch means between said second shaft and the said bevel gear wheel, a third shaft journaled in said casing, a bevel gear wheel secured thereon to mesh with the first named beveled gear wheel, a worm on said third shaft to mesh with the worm wheel of the said differential gearing, driven shafts actuated by said differential gearing, and gears between the said driven shafts and the axles of the tractor wheels.

The cast metal casing is of the general shape and contour as shown in the drawings, and it may consist of half sections 1 and 1 suitably united and secured at their flanges by bolts 2.

Journaled in suitable roller bearings 10 which are retained in said casing is a driving shaft 11, and upon which is an integrally formed worm 12. A second shaft 3 positioned at a right angle to said driving shaft 11 and which is journaled in suitable roller bearings 4, extends outside the said casing. A worm wheel 6 which is secured on said second shaft 3 meshes with the said worm 12. A gear wheel 13 splined on the shaft 3 is held against rotation, but is free to be moved longitudinally on the said shaft. The hub of said bevel gear wheel 13 is provided with annular groove 14. A sleeve 15 has an internal tongue 16 so engaged in said groove that whereas the sleeve is free rotatively, it is held against movement longitudinally of the shaft. Clutch surfaces 17 are provided on the said sleeve, as shown in Figure 5.

Secured to said shaft 3 is a clutch head 18, the clutch surfaces 19 of which are complementary to the clutch surfaces of the said sleeve 15. A bell crank device 20 supported on a pivot 21 has the ends of its yoke 22 pivotally connected by studs 23 to the said sleeve 15. This device is operable by a suitable control lever L.

Journaled in roller bearings 24 of the casing and at a right angle to said shaft 3, and in diagonal axial alignment is a third shaft 25. A bevel gear wheel 26 secured thereon is in mesh with the gear wheel 13. Formed integral with said shaft 25 is a worm 27 which is in mesh with a worm wheel 28. Worm wheel 28 constitutes a part of the differential gearing, the structure and function of which is usual and in itself constitutes no part of the present invention. The driven shafts 30 which are actuated by said differential gearing are journaled in bearings 31. Gear wheels 32 are secured on said driven shafts.

Side lugs 34 which are formed integral with the exterior of the casing, are adapted to be retained in connection with the side members of the frame E by studs or bolts 35.

The invention lends itself to convenience in installation, and is capable of being easily aligned and positioned. The gear wheels 32 are in mesh with and in position at the rear of gear wheels 33, and the latter are secured to the axles H and H of the tractor wheels.

By the new combination and arrangements of parts just described there is materially improved utilization of the motive power operating through the shaft C of the transmission device. The power transmitted through worm 12 is available for actuating the shaft 3 only, or for actuating the gearing of the axles of the tractor wheels of the vehicle. The preferred form of embodiment of my invention is that shown in detail in Figure 4, the parts being so proportioned that the casing is of unitary type, and the several parts are in closely aligned relation.

In using the invention for driving the vehicle the bevel gear wheel 13 is in mesh with the bevel gear wheel 26, as shown in Figure 5. By the power passing from driving shaft 11, and through worm 12 and worm gear 6, the shaft 3 is rotated. In turn, the power passing through shaft 3, bevel gear 13, bevel gear 26, shaft 25, worm 27, worm gear 28, the differential gearing, shafts 30, gear wheels 32, and gear wheels 33, causes the axles H and H of the vehicle to be actuated.

By the foregoing combination and arrangement of parts it is obvious that whereas there is sufficient speed of movement of the tractor wheels when the change speed mechanism is set in "high" gear, it is possible to have an extremely powerful movement of the tractor wheels, though at slow speed, when the change speed mechanism is set at "low" gear. By the use of such auxiliary gearing it is practicable to employ tractor wheels of relatively large diameter, and which are desirable for tractors as distinguished from wheels of lesser diameter. The invention affords such utilization of power that even though the motor may be of nominal capacity, there is insured a movement of the tractor wheels under the most adverse conditions, and without liability of overstrain or injury to any of the parts of the gearing or the vehicle. Thus the range of usefulness of the tractor is extended, and the engine power is more efficiently utilized.

To use the invention solely for actuating machinery other than that of the tractor, the control lever L is shifted. With this shift of the control lever the clutch surfaces 17 of the sleeve 15 assume engagement with the clutch surfaces 19 of the clutch head 18. The bevel gear 13 being thus disengaged from the bevel gear wheel 26, the driving power is acting directly through the shaft 3. A pulley 36 of relatively large size is secured to shaft 3, as shown in Figure 4. The advantage of being able to step up the speed of this pulley, from first, second and to full speed in conformity with the operation of the change speed mechanism from first to second and then to third speed, is especially to be desired. Although no claim is made that relatively high speed of operation of pulley 36 is had, it is obvious that with the power supplied to same as imparted by my improved gearing, any speed desired for machinery driven thereby may be had by belting the pulleys at smaller diameter.

Whereas I have shown and described my invention as embodied in form and construction deemed preferable, I do not wish to be limited specifically to the features and details as shown, as it is obvious that minor changes and modifications may be made therein without departing from the nature or spirit of my invention as same is defined in the appended claims.

What I claim as my invention and desire to secure by Letters Patent is—

1. An auxiliary gearing for motor driven vehicles comprising a casing adapted to be supported by the vehicle frame, a driving shaft journaled in said casing and which is adapted to be actuated by the power from the vehicle motor, a differential gearing with worm wheel retained in the casing, driven shafts articulated with said differential gearing, a worm on the driving shaft, a second shaft journaled in the casing, a worm wheel secured on the said second shaft and which meshes with said worm, a third shaft journaled in said casing at a right angle to said second shaft and in downwardly inclined alignment, a worm on said third shaft to mesh with the worm wheel of said differential gearing, gearing between the second shaft and the third shaft, axle shafts journaled in housings carried by the vehicle frame, at position in advance of the shafts of the differential gearing, and gearing between the axle shafts and the shafts of the differential gearing.

2. A device of the kind described, comprising a casing, a driving shaft journaled therein and which is adapted to be actuated by the power from the vehicle motor, a differential gearing, a worm on the driving shaft, a second shaft journaled in said casing and which extends outside thereof, a worm wheel secured on the said second shaft and which meshes with said worm of the driving shaft, a third shaft journaled in said casing, a worm on the said third shaft to actuate said differential gearing, gearing between the second shaft and the third shaft, and clutch connections between said gearing and the second shaft.

3. A device of the kind described, comprising a casing adapted to be supported by the vehicle, a driving shaft journaled in said casing and which is adapted to be actuated by the power from the vehicle motor, a differential gearing retained in the casing, a worm on the driving shaft, a second shaft journaled in said casing and which extends outside thereof, a worm wheel secured on said second shaft and which meshes with said worm of the driving shaft, a bevel gear wheel splined on said second shaft, a clutch device between said second shaft and the said bevel gear wheel, a third shaft journaled in said casing, a bevel gear wheel secured thereon to mesh with the first named beveled gear wheel, a worm on said third shaft to actuate the said differential gearing, driven shafts articulated with said differential gearing, and gears between the said driven shafts and the axles of the vehicle.

4. An auxiliary gearing for motor driven vehicles comprising a casing adapted to be supported by the vehicle frame, a driving shaft journaled in said casing and which is adapted to be actuated by the power from the vehicle motor, a differential gearing with worm wheel retained in the casing, driven shafts articulated with said differential gearing, a worm on the driving shaft, a second shaft journaled in the casing, a worm wheel secured on the said second shaft and which meshes with said worm, a third shaft journaled in said casing, a worm on said third shaft to mesh with the worm wheel of said differential gearing, gearing between the second shaft and the third shaft, axle housings carried by the vehicle frame, and gearing between the said axle shafts and the shafts of the differential gearings.

GEORGE A. NEWHOUSE.